(12) United States Patent
Sachdeva et al.

(10) Patent No.: US 7,698,703 B2
(45) Date of Patent: Apr. 13, 2010

(54) IMPARTING DIGITAL UNIQUENESS TO THE TYPES OF A PROGRAMMING LANGUAGE USING A UNIQUE DIGITAL SEQUENCE

(75) Inventors: Kapil Sachdeva, Austin, TX (US); Sylvain Prevost, Austin, TX (US)

(73) Assignee: Gemalto Inc., Austin, TX (US)

( * ) Notice: Subject to any disclaimer, the term of this patent is extended or adjusted under 35 U.S.C. 154(b) by 1156 days.

(21) Appl. No.: 11/170,572

(22) Filed: Jun. 29, 2005

(65) Prior Publication Data
US 2007/0000995 A1  Jan. 4, 2007

(51) Int. Cl.
*G06F 9/45* (2006.01)
(52) U.S. Cl. ..................................... 717/176
(58) Field of Classification Search ................. 717/139
See application file for complete search history.

(56) References Cited

U.S. PATENT DOCUMENTS

| | | | | |
|---|---|---|---|---|
| 5,812,819 A | * | 9/1998 | Rodwin et al. ............... 703/23 |
| 6,005,942 A | * | 12/1999 | Chan et al. .................. 713/187 |
| 6,308,317 B1 | * | 10/2001 | Wilkinson et al. .......... 717/139 |
| 6,941,556 B1 | * | 9/2005 | Kessler et al. ............... 719/316 |
| 6,983,458 B1 | * | 1/2006 | Honda ......................... 717/151 |
| 7,065,680 B2 | * | 6/2006 | Mantyla ...................... 714/49 |
| 7,114,070 B1 | * | 9/2006 | Willming et al. ............ 713/156 |
| 2005/0234980 A1 | * | 10/2005 | Birkenhauer et al. ..... 707/103 Y |

* cited by examiner

*Primary Examiner*—John Chavis
(74) *Attorney, Agent, or Firm*—Pehr B. Jansson; The Jansson Firm

(57) ABSTRACT

A system and method for establishing uniqueness in type definition names. Each application vendor has associated therewith a unique data sequence. The data sequence is combined with the type definition name and then a digital operation is performed to produce a unique digital identifier that is used in place of the type name.

20 Claims, 4 Drawing Sheets

IMPARTING DIGITAL UNIQUENESS TO THE TYPES OF A PROGRAMMING LANGUAGE USING A UNIQUE DIGITAL SEQUENCE

BACKGROUND OF THE INVENTION

1. Field of the Invention

The present invention relates generally to namespace uniqueness for computer programs during run-time and more particularly to namespace uniqueness for type definitions stored on smart cards and used by application software.

2. Description of the Related Art

Smart cards are small personal computing devices that are used to protect very sensitive information. Smart cards may be used to provide banking functions, access to health records, personalization of computer network access, secure building access, and many more functions. Smart cards are also used as subscriber identity modules (SIM) in certain mobile telephony networks.

A recent trend in smart card technology is so called multi-application smart cards. These cards may be programmed with multiple disjointed application programs. For example, the same card may be used to access both banking records as well as provide health care information. The different applications running on a smart card may be written by the same author or may come from different vendors. Examples of multi-application cards include the Cyberflex family of cards from Axalto Inc.

A common feature of multi-application smart cards is that the application programs may be loaded onto the smart card after the card has been issued by the manufacturer or even after an end-user has taken possession of the card. Each such application program in a multi-application smart card is stored in some form of programmable memory on the smart card.

Applications written for multi-application smart cards are usually developed in high level languages such as C# or Java and then converted to a format appropriate for smart cards. The process of preparing applications for a smart card may involve compiling the high level source code into an intermediate binary format and then converting the intermediate format to a smart card specific format. The smart card specific format is one that is optimized for the smart card environment. It is used to help conserve the limited memory and other resources provided by the smart card hardware and may also help provide security.

When multiple applications are loaded onto a smart card additional memory can be conserved by sharing common routines, data type definitions, and class type definitions between the applications. These common definitions and routines may be stored in libraries that are accessible by different applications. The applications reference the routines and type definitions by name. There is a potential for the same name to be defined in more than one library or application that is loaded onto a smart card making the name ambiguous. If an application attempts to access the definition by such a name the application cannot link to the correct definition. In a smart card environment the process that loads applications onto the card will reject the application if that situation occurs.

For .NET based smart cards the type definitions stored on the smart card are not necessarily stored in a text format. Instead, the conversion process, usually performed by a converter program of a smart card software development kit, produces the smart card specific format. As part of the conversion process the type definition names are converted from the high level language text format into a more compact binary format.

To make the type names more unique, additional information can be concatenated with the names before the conversion process. Several forms of additional information have been used to improve the uniqueness of the resulting codes: namespace names, library names, vendor names, etc. Although this method improves the uniqueness of the codes because of the greater likelihood that the library or vendor names used as components of the type definitions name will be unique, that technique does not completely solve the problem as there is still a high likelihood of a collision between the names of type definitions provided from two unrelated sources. Therefore, there is still a need for a method to produce a truly unique identification code from a type name.

SUMMARY OF THE INVENTION

In a preferred embodiment, a system and method according to the invention produces unique identification codes for type definitions that are referenced by multiple applications in a smart card by concatenating each type name with a unique data sequence and then performing a digital operation on the concatenated results. The results of the digital operation are used by application programs to reference the type definition instead of using the type name. This method assures that the type identifiers are unique even when the type definitions originate from different sources.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
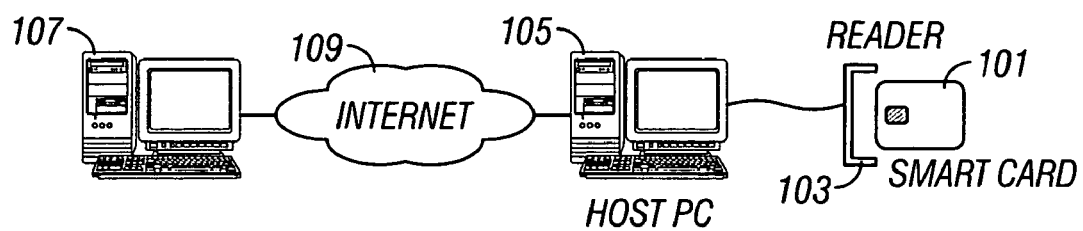
FIG. 1 is a schematic illustration of the operating environment in which a smart card according to the invention may be used to provide secure computing services.

In the following detailed description and in the several figures of the drawings, like elements are identified with like reference numerals.

As shown in the drawings for purposes of illustration, the invention is embodied in a system and method for imparting digital uniqueness in type definitions of a high level programming language used to develop applications for a multi-application smart card. The system and method according to the invention uses a unique digital identifier that is created by performing a digital conversion process on a type name combined with a unique data sequence. In a preferred embodiment the unique data sequence is the public key token portion of the public key associated with the vendor that developed the type definition. Public keys are described in Richard E. Smith, *Authentication: From Passwords to Public Keys*, Addison-Wesley, 2001, ISBN: 0201615991, the entire disclosure of which is incorporated herein by reference.

FIG. 1 is a schematic illustration of the operating environment in which a resource-constrained device according to the invention may be used to provide secure communication with a remote entity. A resource-constrained device 101, for example, a smart card, is connected to a computer network 109, for example, the Internet. The resource-constrained device 101 may be connected to the computer network 109 via a personal computer 105 that has attached thereto a card reader 103 for accepting a smart card. However, the resource-constrained device 101 may be connected in a myriad of other ways to the computer network 104, for example, via wireless communication networks, smart card hubs, or directly to the computer network 109. The remote node 105 is a computer system of some sort capable to implement some functionality that may either seek access to information on the smart card 101 or to which the smart card user may seek access. For example, the remote node 107 may be executing banking software that a user of the smart card 101 is seeking to obtain access to. The smart card 101 may then provide some access control functionality or may even be an electronic purse to which funds are downloaded from the remote computer.

The scenario of FIG. 1 is presented here merely for the purpose of providing an example and must not be taken to limit the scope of the invention whatsoever. Only the imagination of designers limits the myriad of possible deployment scenarios and uses for smart cards.

Figure 2:
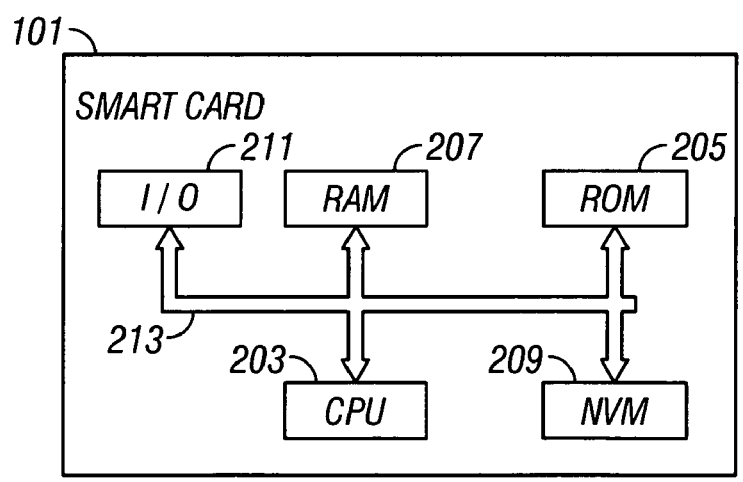
FIG. 2 is a schematic illustration of an exemplary architecture of a resource-constrained device.

FIG. 2 is a schematic illustration of an exemplary architecture of a resource-constrained device 101. The resource-constrained device 101, e.g., a smart card has a central processing unit 203, a read-only memory (ROM) 205, a random access memory (RAM) 207, a non-volatile memory (NVM) 209, and a communications interface 211 for receiving input and placing output to a device, e.g., the card reader 102, to which the resource-constrained device 101 is connected. These various components are connected to one another, for example, by bus 213. In one embodiment of the invention, the SSL/TLS module 103, as well as other software modules shown in FIG. 1, would be stored on the resource-constrained device 101 in the ROM 206. During operation, the CPU 203 operates according to instructions in the various software modules stored in the ROM 205.

Figure 3:
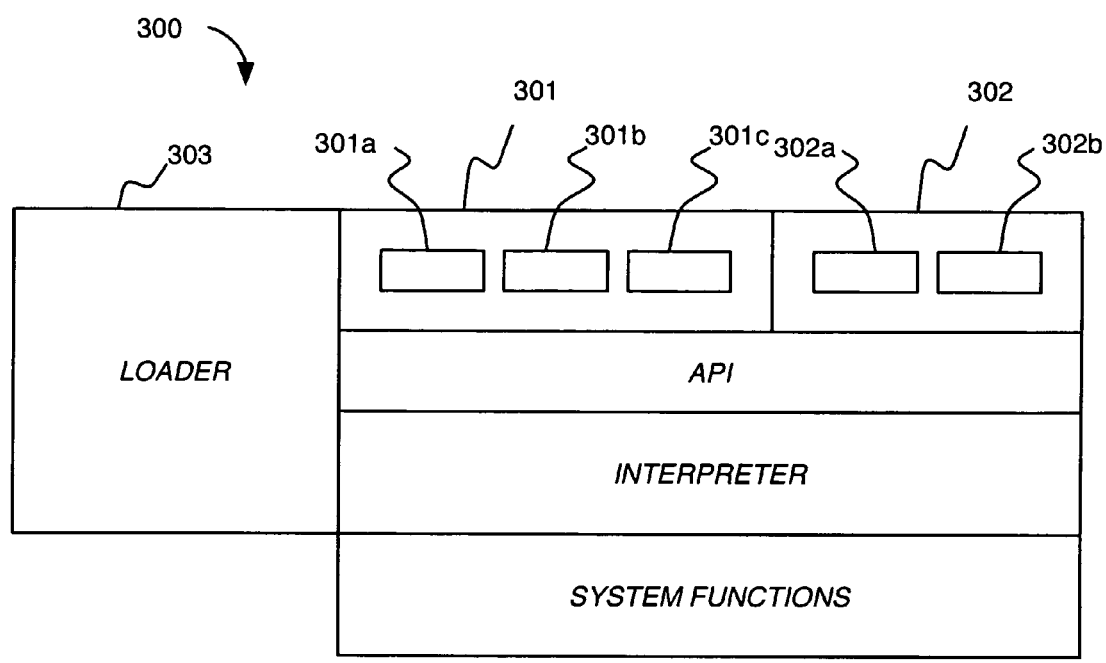
FIG. 3 is a schematic illustration of a software architecture for a resource-constrained device.

FIG. 3 is a block diagram of an exemplary software architecture 300 that one may find implemented on a smart card 101. The software architecture 300 includes several application programs 301, e.g., application programs 301, 301', and 301". The architecture may also include several runtime libraries, e.g., runtime libraries 302 and 302'. These applications and libraries are loaded onto the smart card by a loader 303. The application programs 301 and libraries 302 would typically be loaded into the non-volatile memory 209. However, in other scenarios an application program or library may be permanently written onto the smart card at manufacture by having it stored in the ROM 205. If the smart card 101 is called upon to execute a program for only one session, it would be possible to have the program loaded in the RAM 207. However, that would be a rare circumstance. On the other hand, during execution of an application program, it is indeed possible that certain portions of the application program are loaded into the RAM 207.

In this example, several application programs 301 are executed by the CPU 203 under the control of instructions of an interpreter 305. The interpreter 305 may, for example, be a Javacard Virtual Machine as found on the Cyberflex smart card family from Axalto Inc. or the interpreter of a smart card implementing a .NET CLI (Common Language Infrastructure) as found in the .NET smart card technology from Axalto Inc. (www.axalto.com/infosec/NET_faq.asp). In alternative embodiments, the application programs 301 are compiled into executable code and do not require further interpretation by the interpreter 305. However, in such embodiments, the job control would be managed by some operating system program that would take the place of the interpreter 305.

The interpreter 305 is usually a static component of a smart card 101 and would therefore be loaded into the ROM 205. The interpreter 305 may also be burned into some form of firmware. In another alternative the interpreter 305 may be stored in the non-volatile memory 209.

In most embodiments of the invention, the smart card software architecture 300 also includes some system functions 307. System functions 307 may include security functionality, cryptography functionality, and utility libraries which may be called by application programs 301.

The application programs 301 may access functions provided by the smart card system software 307 by issuing calls through an application program interface 309. The application programs 301 may also access functions, data types, and class types stored in the runtime libraries 302. As the loader 303 loads the applications 301 onto the smart card it checks any references to type definitions and routines. The loader 303 will only allow the applications 301 if each reference can be uniquely matched to a definition in the applications 301, runtime libraries 302, or system functions 307.

One possible issue with a multi-application smart card 101 is that the names used for type definitions in the application 301 or runtime libraries 302 may not be unique. This problem is more likely to occur when the applications 301 and runtime libraries 302 are independently developed by different vendors. For example application 301' and application 301" may each be developed by a different vendor. It is possible that the same name could be used in 301' and 301" for different type definitions. The loader 303 would detect this name collision and because of the name collision, avoid loading application 301" if application 301' were already loaded on the smart card. The loader 303 may also prevent a library 302 from being loaded onto the smart card 101 if it redefined and existing type definition.

In a preferred embodiment of the present invention, the type definitions used by the applications 301 are referenced by a unique identifier instead of the type name. The unique identifiers are stored in both the applications 301 or libraries 302 that define the type and the applications 301 that reference the type definitions. The unique identifier is produced as part of the development flow that is used for developing applications on a multi-application smart card.

Figure 4:
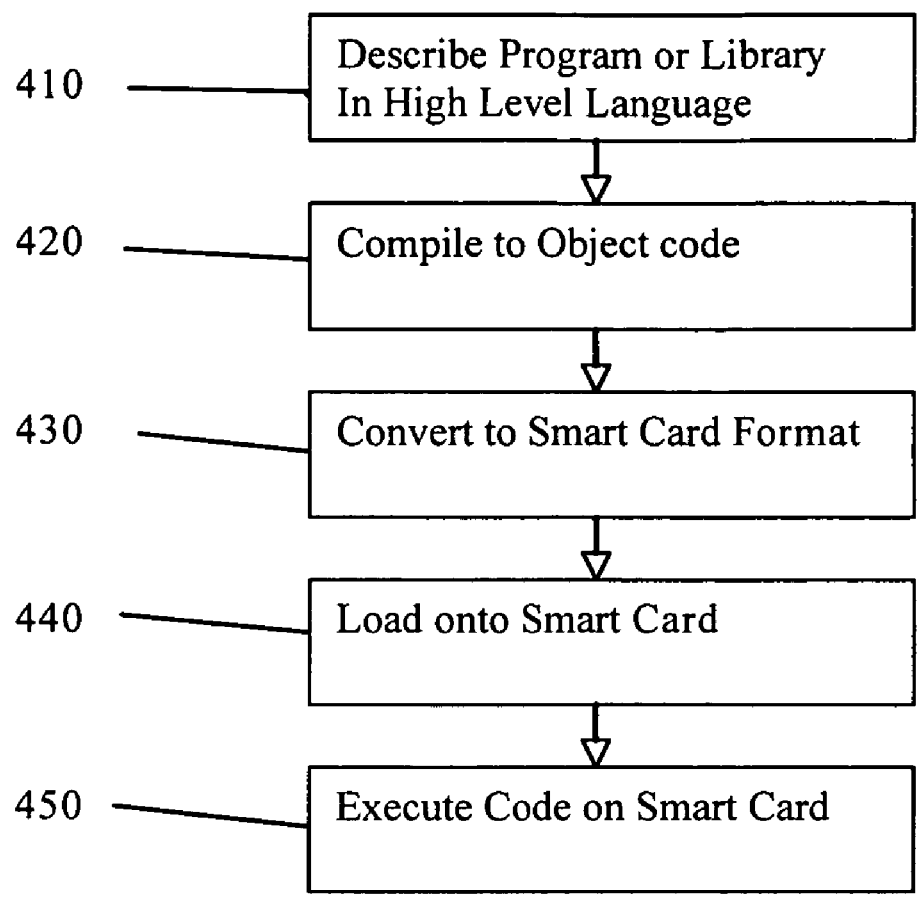
FIG. 4 is a flow diagram illustrating the development process used to create and execute applications and libraries on a smart card.

FIG. 4 is a flow diagram illustrating an exemplary development flow 400 used to produce and execute applications and libraries on a multi-application smart card. In many cases a high level programming language such as C# or Java is used to describe the program or library. The high level code is then compiled into an intermediate object format. The object format is converted into a format that is optimized for the smart card architecture. The coding 410 and compile 420 steps are normally performed on a computer system such as a personal computer that has more resources than a smart card. The conversion 430 step may also be performed on a personal computer or it may be performed on the smart card. The remaining steps of loading 440 and executing 450 the application are performed on the smart card by the loader 303 and interpreter 305 respectively.

Figure 5:
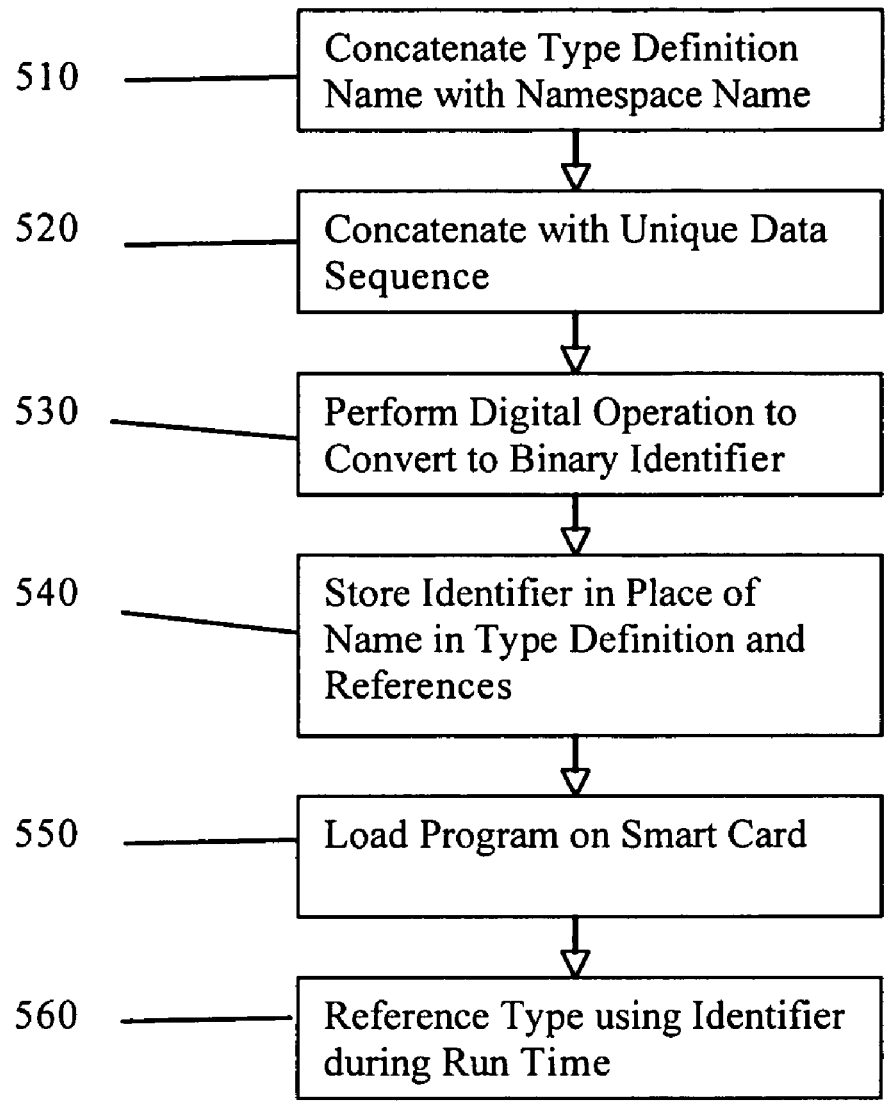
FIG. 5 is a flow diagram illustrating a method for creating a unique type identifier in accordance with an embodiment of the present invention.

FIG. 5 is a flow diagram illustrating the method or system according to the invention to create and reference a unique identifier for a type definition in a smart card. In a preferred implementation the steps 510, 520, 530, and 540 may be implemented as part of the conversion process 430 of the exemplary development flow 400. Some or all of these steps may be performed on a development system such as a personal computer. The steps that are not performed on the development system may be performed on the smart card, for example, by the loader 303.

Initially in step 510 the type definition name is concatenated with the namespace name to produce a more unique text name. Various text strings may be used as part of the namespace name in order to make the resulting concatenated name more unique. Some examples include library names, vendor names, and fully qualified domain names. Next in 520 the text string resulting from 510 is concatenated with a unique data sequence associated with the vendor to produce a unique string identifier. In a preferred embodiment of the present invention the public key token associated with the vendor is used for the unique data sequence. The public key token consists of the first eight bytes of the public key associated with the vendor in the public key infrastructure or PKI. Since no two vendors have the same public key token the string identifier resulting from 520 is unique.

The unique string identifier produced from 520 may be large in size because it is the concatenation of several names and a data sequence. Since smart cards have limited resources the size of the identifiers needs to be kept as small as possible. Therefore, the digital operation performed in 530 serves to reduce the size of the identifier while still preserving the uniqueness. In a preferred embodiment of the present invention a one way hash or message digest function such as MD5 or SHA-1 is used accomplish these goals. For example, if MD5 hashing is used for the digital operation in 530 then some portion of the resulting 128 bit message digest can serve as the unique identifier. The identifier may be chosen to be the first 16 bits, first 32 bits, or some other subset of the message digest. The size of the unique digital identifier is the same regardless of the size of the unique string identifier produced in 520. This small, constant size allows the identifier to be efficiently stored on a resource limited smart card. The one way hashing functions also maintain the uniqueness of the identifier since there is an extremely low probability that two unique strings will result in the same identifier. MD5 is described in "The MD5 Message-Digest Algorithm", IETF Network Working Group RFC 1321, by R. Riverst, which is incorporated herein by reference. SHA-1 is described in "US Secure Hash Algorithm 1 (SHA1)", IETF Network Working Group RFC 3174, by D. Eastlake, and P. Jones, which is incorporated herein by reference.

After the unique identifier is created in step 530 it can be used by applications and libraries to reference the type definition. As part of the conversion process 430 the identifier is stored in place of the type name in the application or library that defines the type. The identifier is also stored at locations in the applications or libraries that reference the defined type. These operations make up step 540. After the conversion process 430 is complete the applications and libraries can be loaded onto the smart card in step 440. During this step the loader 303 verifies that all references to type definitions are uniquely resolved. Finally, during execution of the applications 301 by the interpreter 305 the unique identifiers are used to reference the type definitions instead of the type definition names.

To further illustrate the invention an example of a namespace uniqueness problem that is corrected by the invention is illustrated in Table 1:

Vendor A writes a program PA which contains Type MyGoodType which belongs to namespace MyGoodNamespace 1—Vendor A has an associated PKI key, KeyA, and a key token, TokenA

```
Type definition contained in PA:
    namespace MyGoodNamespace{
        public class MyGoodType{
            private int x__width;
            private int y__width;
            public void DrawShape( ){
                int z = x__width*2 + y__width*5;
}}}
```

2—Vendor B also writes a program PB which contains Type MyGoodType and which belongs to namespace MyGoodNamespace Vendor B has an associate PKI key, KeyB, and a key token, TokenB

```
Type definition contained in PB:
    namespace MyGoodNamespace{
        public class MyGoodType{
            private string name;
            private string jobtitle;
            public void ManagePerson( ){
                if(name == "Joe")
                jobtitle = "Doctor";
}}}
```

TABLE 1: Code examples illustrating a namespace uniqueness problem that is corrected by the invention.

The example shows sample high level language code provided by two vendors. Since the vendors developed the code independent of one another the name spaces were not kept unique and a conflict occurred. Both vendors created a class type called MyGoodType but with different definitions for the class. If the two applications, PA and PB, referenced the class type by the name MyGoodType then they could not be loaded onto a smart card at the same time. The loader 303 would detect the multiple definitions and prevent both applications from being loaded together. Also, since the namespaces are also the same the problem cannot be solved by concatenating the namespaces and type names. The results of that operation would be the same for PA and PB: MyGoodNamespace.MyGoodType.

The two vendors discussed in the context of Table 1 have public keys associated with them in the PKI. For vendor A the key is KeyA and the first eight bytes of that key is defined to be TokenA. Similarly, vendor B has associated key KeyB and token TokenB. In a preferred embodiment of the invention the public key token is used for the unique data sequence in 520 and MD5 is used for the digital operation in 530. Therefore, the unique identifier, IDA, for program PA is generated as IDA=MD5(MyGoodNameSpace.MyGoodType.TokenA). Similarly, the identifier, IDB, for program PB is generated as IDB=MD5(MyGoodNameSpace.MyGoodTYpe.TokenB). Since TokenA and TokenB are unique, identifiers IDA and IDB as also unique. All references to MyGoodType in program PA are replaced with references to IDA and references to MyGoodType in PB are replaced with IDB. Therefore, the namespace uniqueness problem is avoided and both applications PA and PB may be loaded on the same smart card.

Although specific embodiments of the invention have been described and illustrated, the invention is not to be limited to the specific forms or arrangements of parts so described and illustrated. For example, while the invention has been described in the context of smart cards, the invention is applicable to use with other resource-constrained devices. Also, a different unique data sequence may be used in place of the public key token and any digital operation may be used to produce the unique identifier as long as it maintains the uniqueness of the identifier. The invention is limited only by the claims.

We claim:

1. A method of imparting digital uniqueness to type definitions originating from at least two sources and used in programming a smart card, comprising:

associating a unique data sequence to a programming unit containing a type definition having a type name;

concatenating the type name with the unique data sequence thereby producing a concatenation result;

performing a digital operation to produce an operation result that is a function of the concatenation result; and using the operation result in lieu of the type name when performing operations that require the type name.

2. The method of imparting digital uniqueness to type definitions of claim 1 wherein the programming unit is a .NET™ assembly.

3. The method of imparting digital uniqueness to type definitions of claim 1 wherein the programming unit is a JAVA™ class or jar file.

4. The method of imparting digital uniqueness to type definitions of claim 1 wherein the unique data sequence is a public key token assigned to the programming unit.

5. The method of imparting digital uniqueness to type definitions of claim 1 wherein the unique data sequence is a Universal Identifier (UID) assigned to the programming unit.

6. The method of imparting digital uniqueness to type definitions of claim 1 wherein the digital operation is a hashing algorithm.

7. The method of imparting digital uniqueness to type definitions of claim 1 wherein the hashing algorithm is selected from the set including MD5 (Message-Digest algorithm 5) and SHA-1 (Secure Hash Algorithm 1).

8. The method of imparting digital uniqueness to type definitions of claim 1 wherein the digital operation produces a compressed digital string that uniquely identifies the type definition.

9. A method of operating a smart card programming environment to produce application programs for a smart card such that uniqueness of type names are ensured for types defined by multiple sources wherein a first type definition from a first source and a second type definition from a second source may have identical names, comprising:

receiving a program unit written in a high-level programming language wherein the program unit has associated therewith a unique identifier;

compiling the program unit into an intermediate code program unit; and converting the intermediate code program unit into a converted code program unit suitable for execution on a smart card, the converting step comprising:

identifying type names;

concatenating the type names with the unique identifier producing a concatenation result;

hashing the concatenation result with the unique identifier thereby producing a hashcode; and using the hash code in lieu of the type name.

10. The method of operating a smart card programming environment of claim 9 wherein the unique identifier is a public key token associated with the program unit.

11. The method of operating a smart card programming environment of claim 9 wherein the program unit is a .NET™ assembly.

12. The method of operating a smart card programming environment of claim 9 wherein hashing step comprises performing an MD5 (Message Digest algorithm 5) or a SHA1 (Secure Hashing Algorithm 1) operation on the concatenation result.

13. A computer having a programming environment capable of causing the computer to impart digital uniqueness to type definitions originating from at least two sources and used in programming a smart card, the programming environment comprising:

means for causing the computer to associate a unique data sequence to a programming unit containing a type definition having a type name;

means for causing the computer to concatenate the type name with the unique data sequence thereby producing a concatenation result;

means for causing the computer to perform a digital operation to produce an operation result that is a function of the concatenation result; and means for causing the computer to use the operation result in lieu of the type name when performing operations that require the type name.

14. The computer having a programming environment capable of imparting digital uniqueness to type definitions of claim 13 wherein the programming unit is a .NET™ assembly.

15. The computer having a programming environment capable of imparting digital uniqueness to type definitions of claim 13 wherein the programming unit is a JAVA™ class or jar file.

16. The computer having a programming environment capable of imparting digital uniqueness to type definitions of claim 13 wherein the unique data sequence is a public key token assigned to the programming unit.

17. The computer having a programming environment capable of imparting digital uniqueness to type definitions of claim 13 wherein the unique data sequence is a Universal Identifier (UID) assigned to the programming unit.

18. The computer having a programming environment capable of imparting digital uniqueness to type definitions of claim 13 wherein the digital operation is a hashing algorithm.

19. The computer having a programming environment capable of imparting digital uniqueness to type definitions of claim 13 wherein the hashing algorithm is selected from the set including MD5 (Message-Digest algorithm 5) and SHA-1 (Secure Hash Algorithm 1).

20. The computer having a programming environment capable of imparting digital uniqueness to type definitions of claim 13 wherein the digital operation produces a compressed digital string that uniquely identifies the type.

* * * * *